Dec. 26, 1961  D. D. PEEBLES ET AL  3,014,803
SWEETENING PRODUCT AND METHOD OF MANUFACTURE
Filed July 8, 1959
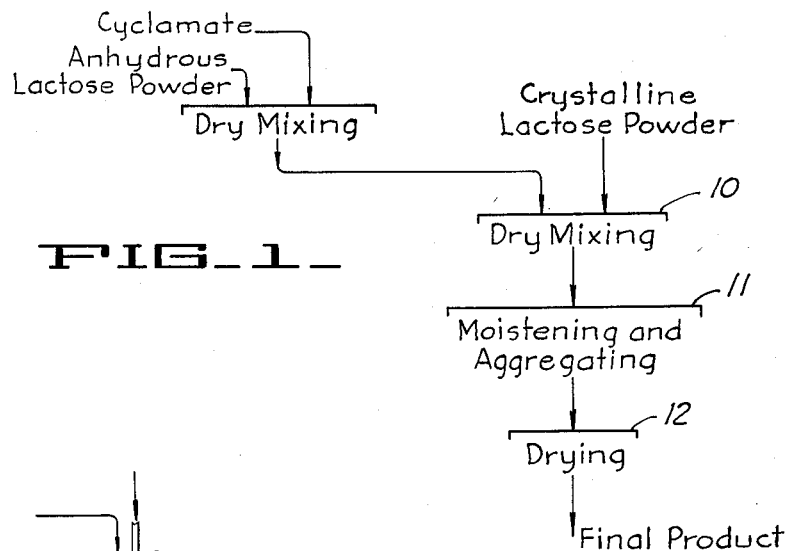
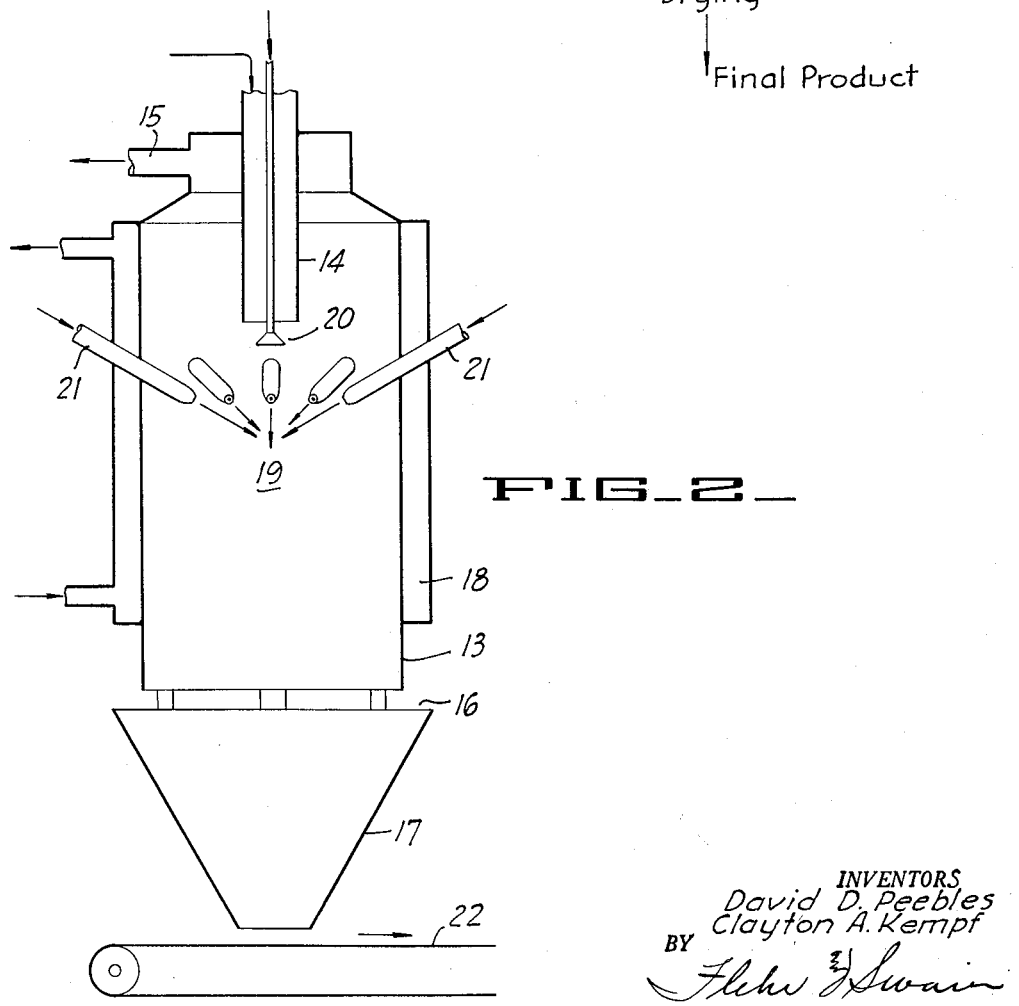
INVENTORS
David D. Peebles
Clayton A. Kempf
BY
ATTORNEYS

United States Patent Office 3,014,803
Patented Dec. 26, 1961

3,014,803
SWEETENING PRODUCT AND METHOD OF MANUFACTURE
David D. Peebles, Davis, and Clayton A. Kempf, Berkeley, Calif., assignors to Foremost Dairies, Inc., San Francisco, Calif., a corporation of New York
Filed July 8, 1959, Ser. No. 825,705
5 Claims. (Cl. 99—141)

This invention relates generally to edible sweetening products for use in place of the more common sugars, such as sucrose or corn sugar, and to methods for manufacturing the same.

Synthetic sweetening agents, such as cyclohexyl sulfamate calcium dihydrate, sodium cyclohexylsulfamate or similar cyclamate, have found wide application in the food industry, particularly because of their low caloric value. Such products are available in the form of crystalline powder, which for a given weight is many times sweeter than sucrose. In contrast with the larger amounts of ordinary sugar (e.g. sucrose) that may be used for a given sweetening effect, the amount of cyclamate for the same degree of sweetening may be $\frac{1}{20}$ (by weight) that of the sugar. For many fields of application, such as the domestic consumer market, this property handicaps the sale of cyclamate, because measurement of such concentrated sweetening agents for a desired sweetening effect is relatively critical.

In general it is an object of the present invention to provide an edible sweetening product which for a given volume has about the same sweetening effect as ordinary sucrose or granulated sugar.

Another object of the invention is to provide a product of the above character which contains a base material that is completely compatible with cyclamate, and which has desirable properties with respect to wettability and dispersibility of the product.

Another object of the invention is to provide a product of the above character which is in such physical form that it has a relatively low bulk density, and in addition is substantially nonhygroscopic and free flowing.

Another object of the invention is to provide a dietetic sweetening agent suitable for diabetics.

Another object of the invention is to provide a novel method for the manufacture of the above product.

Additional objects and features of the invention will appear from the following description in which the preferred embodiments have been set forth in detail in conjunction with the accompanying drawing.

Referring to the drawing:

FIGURE 1 is a flow sheet illustrating one procedure for carrying out the present method.

FIGURE 2 is a side elevational view in section schematically illustrating equipment which can be used in carrying out the method.

In general, the present invention is characterized by the fact that lactose is used as a carrier medium or vehicle for cyclamate. Weight for weight, lactose has less caloric value than sucrose. Its sweetness is only a fraction of that of sucrose, and ordinarily it is not used as a sweetening agent. In accordance with the present invention, cyclamate is incorporated with lactose in such a manner as to produce a free flowing product consisting of highly wettable porous aggregates, in which the cyclamate is homogeneously dispersed.

The procedure illustrated in FIGURE 1 is as follows: Crystalline lactose powder (i.e. alpha lactose monohydrate), of edible grade, is applied to the dry mixing operation 10 where it is intermixed with a measured amount of dry cyclamate powder, such as calcium cyclohexylsulfamate dihydrate or sodium cyclohexylsulfamate. Preferably the cyclamate powder has been premixed with a measured amount of anhydrous lactose powder having the major part of its lactose in the amorphous form. In the dry mixing operation 10, the crystalline and anhydrous powders are homogeneously intermixed, and the cyclamate is homogeneously dispersed throughout the lactose.

In step 11 the dry powder mix is treated to convert the same to the form of moist porous aggregates. In effect, this step is a moistening and aggregating operation in which the particles of powder are moistened whereby particularly the particles of anhydrous lactose powder become sticky. The powder particles are then caused to be brought into repeated random contact, whereby they cling together in the form of moist composite porous aggregates. This moistening and aggregating operation is carried out in such a manner that the particles of crystalline lactose, and likewise the particles of cyclamate, are not materially affected. Particularly, they are not melted or dissolved to any extent during processing. However, the anhydrous lactose particles that are made sticky by the added moisture serve as a bonding medium to cause the other crystalline particles to adhere together in the form of firm random composite aggregates.

The moist composite aggregates leaving step 11 are subjected to drying 12 without crushing or grinding, to produce a final product having a free moisture content of less than 1%, and a total moisture content of about 3.5%.

The crystalline lactose powder supplied to the method preferably has a relatively small particle size, as for example a size such that the majority of the material passes through a 100 mesh screen. Such a powder can be made by spray drying a lactose concentrate containing very fine lactose crystals, or by grinding a coarser crystalline material. The moisture content of such a crystalline product can be of the order of 5.2 to 6.0% (total). The anhydrous lactose powder supplied to the method can be made by spray drying a concentrated lactose solution, whereby the lactose content in the powder produced is in the amorphous form. It is likewise desirable that the anhydrous powder has a relatively small particle size, as for example, a size such that the majority of the material passes through a 100 mesh screen.

The equipment shown in FIGURE 2 for carrying out the moistening and aggregating step may consist of a vertical chamber 13 having a downwardly extending inlet conduit 14 for receiving the dry powdered mix as conveyed pneumatically from a suitable supply source. Some air is removed from the chamber through conduit 15, whereby air is drawn into the chamber through the lower opening 16 between the main part of the chamber and the discharge hopper 17. The sides of the chamber can be kept warm by circulating warm air through the jacket 18, thereby preventing moisture from condensing upon the inner surfaces. The dispersed powder passes through zone 19 where it is comingled with finely atomized water discharged from nozzle 20. Also some saturated steam is introduced by way of nozzle 21. The falling powder acquires moisture from the water droplets and water vapor whereby the material discharged upon the conveyor 22 has a predetermined moisture content. Good results have been secured when the material discharging from hopper 17 has a total moisture content of the order of about 8 to 16%, from 10 to 12% being deemed optimum. The temperature level within the zone 19 can be adjusted by adjusting the proportioning between the water and the steam introduced. Good results have been secured by maintaining an average temperature level within zone 19 of the order of from 100 to 150° F. about 130° F. being optimum.

As the particles of powdered material are comingled with the vapor and atomized water in zone 19, moisture distributes itself upon the surfaces of the particles. The time period and treatment temperature within the zone is such that the lactose and cyclamate crystals are not materially affected. However, the particles of anhydrous lactose become relatively sticky whereby they serve as a sticky medium to cause adherence between all of the particles, when they are brought into random physical contacts. Sufficient comingling takes place within the treatment zone whereby the particles are brought into repeated direct contact with the result that the particles are caused to adhere together in the form of moist porous random aggregates. The time period of treatment in the equipment of FIGURE 2 may range from about 10 to 60 seconds.

Immediately after the aggregates are formed and before they have been discharged from hopper 17, some of the sticky lactose commences to crystallize, thereby making the aggregates stronger and less susceptible to breakage. Such crystallization is accompanied by reduction in surface stickiness, whereby the aggregates discharged upon conveyor 22 do not tend to adhere together in the form of a cake. While in transit on conveyor 22, the aggregates are held in a quiescent and compact mass, and during this holding period, which may range from about 30 to 90 seconds, there is a reduction in temperature (e.g. from 100 to 90° F.) and a further reduction in surface stickiness with an increase in the strength of the aggregates. The conveyor 22 delivers the material in free flowing form to the equipment used for final drying. This equipment is such as to avoid a substantial amount of crushing or grinding of the aggregates. Suitable equipment for this purpose employs a screen provided with small perforations and which is vibrated to cause the material to progress from the feed to the discharge end of the same and to apply vertical motion to maintain the powder as a loose working layer. In conjunction with the vibrating action, warm dry air is delivered upwardly through the screen to pass upwardly through the layer of powder. The number and size of the openings in the screen is so chosen in relation to the rate of air delivery therethrough that the product moving along the screen is fluffed or levitated to form a layer several times the thickness it would normally have if at rest. By this method the product is caused to progress along the screen and is at least partially supported by the cushion of air intermingled therewith. This provides drying without rough or mechanical handling which might break up the powder aggregates.

The final product from the dryers may be subjected to screening and sizing operations to produce a material of relatively uniform size requirements. A typical product made in accordance with the present method has a particle size such that the bulk of the material passes through a 20 mesh screen, but remains on an 80 mesh screen. Undersize material passing through an 80 mesh screen can be rejected or returned to the method, as for example back to the mixing operation 10.

The anhydrous lactose powder comprises a minor part of the total amount of lactose being supplied to the method. For example good results have been obtained when the anhydrous powder comprises from 20 to 30% of the total lactose powder, about 27% being optimum.

When too small an amount of anhydrous powder is employed, the aggregates formed are relatively weak. An excessive amount of anhydrous powder causes excessive stickiness, thus interfering with proper continuous operation of the apparatus.

The amount of cyclamate employed may vary depending upon the sweetness desired for the final product. For example, we have varied the amount of cyclamate in the final product over the range of from 5 to 10% (by weight). Assuming that one desires to produce a material having sweetening properties comparable to ordinary granulated sugar, then 10% of calcium cyclohexyl sulfamate dihydrate, may be present in the final product, and the product may have a bulk density of the order of 300 grams per liter.

Our product has many desirable characteristics. In general, it appears as a white granular material, which on superficial inspection may appear to be similar to granulated sugar. However, the individual granules are in the form of porous composite aggregates, the aggregates consisting of particles of the original crystalline lactose, together with particles of the cyclamate powder, both bonded together by lactose originating with the anhydrous lactose powder. The cyclamate is uniformly distributed through the individual granules, and also through a bulk mass of the material. Bulk density of the product is dependent somewhat upon the specific procedures used for forming the aggregates, but may vary from 250 to 350 grams per liter. The major part of the lactose present is in the hydrate or crystalline form. The material is free flowing and is not hygroscopic with respect to atmospheric moisture. It can be packaged in ordinary cartons provided with a pouring spout.

When a quantity of the product is deposited upon a quantity of cold water in a tumbler, the mass of aggregates is quickly wetted and sinks to the bottom of the tumbler. It quickly dissolves with simple stirring. High wettability is attributed to the fact that water freely penetrates a mass of the material, and also penetrates the pores of the individual aggregates, whereby the rate of solution is governed by the size of the individual lactose and cyclamate crystals, rather than the size of the aggregates. In hot water the product wets and dissolves almost instantly. As previously stated the sweetness of the product is dependent upon the amount of cyclamate employed in proportion to the lactose present. However, the lactose is completely compatible with the sweet taste of the cyclamate, and does not impart any off flavor.

By way of example, in one particular instance the product was made as follows: An edible lactose powder was prepared by spray drying a lactose concentrate containing fine seed crystals of lactose, to produce a crystalline lactose powder having such particle fineness that 100% of the material passed through a 100 mesh screen, and 40% through a 200 mesh screen. This material had a moisture content (total) of about 5.8%. About 66 parts of such crystalline lactose powder was dry mixed with 24 parts (by weight) of anhydrous lactose powder. There had been previously mixed with the anhydrous powder an amount of dry powdered cyclamate sufficient to provide the final product with a cyclamate content of 10%. The anhydrous lactose powder had a particle fineness such that 100% of the material passed through a 100 mesh screen and 60% through a 200 mesh screen. It had a moisture content (total) of about 1.5%. The cyclamate powder had a particle fineness such that 100% of the material passed through a 100 mesh screen and 50% through a 200 mesh screen. It had a moisture content (total) of about 2%. The dry mix of the three ingredients was then supplied continuously to the apparatus of FIGURE 2, with the atomized water and steam being introduced into the zone 19 to maintain this zone at an average temperature of about 130° F. The moist porous aggregates being delivered from the hopper 17 had a moisture content (total) of about 10%. The holding time during transient upon the conveyer 22 was about 40 seconds. The drying apparatus employed was of the type previously described with an inlet temperature for the drying air of about 275° F. A screen analysis of the final product was as follows:

| | Percent |
|---|---|
| Through 20 mesh screen | 0 |
| On 50 mesh screen | 78.4 |
| Through 50 on 80 mesh screen | 18.8 |
| Through 80 on 100 mesh screen | 2.8 |

The final product had a moisture content (total) of about 1.5%, and a bulk density of about 300 grams per liter. It was a white free flowing material having about the same sweetness as granulated sugar, and it was readily wettable and soluble in either hot or cold water.

It will be evident that we may deviate somewhat from the procedure described with reference to FIGURE 1, without departing from the invention. For example, instead of separately mixing dry powdered anhydrous lactose and the cyclamate, it is possible to incorporate these two ingredients in a concentrated solution, and then spray dry this solution to form a material containing anhydrous lactose. Such material is then dry mixed in step 10 with crystalline lactose powder, or subjected by itself to the instantizing operation.

We claim:

1. In a method for the manufacture of a sweetening product, the steps of forming a mixture of cyclamate with lactose, the sweetening comprising about 5 to 10% of the mix, and converting the mixture to the form of porous composite aggregates in which the cyclamate is homogeneously dispersed.

2. In a method for the manufacture of a sweetening product, the steps of forming a dry powdered mix of cyclamate with lactose, the cyclamate comprising about 5 to 10% of the mix, and converting the mixture to the form of porous composite aggregates in which the cyclamate is uniformly dispersed.

3. In a method for the manufacture of a sweetening product, the steps of forming a dry powdered mix of crystalline cyclamate with both crystalline and anhydrous lactose powders, the cyclamate comprising about 5 to 10% of the mix, and then converting the mix to the form of porous composite aggregates in which the cyclamate is uniformly dispersed.

4. In a method for the manufacture of a sweetening product, the steps of forming a dry mix of crystalline lactose powder, anhydrous lactose powder, and crystalline cyclamate powder, the cyclamate comprising about 5 to 10% of the mix, causing the dry mix to progress in dispersed condition through a treatment zone, continuously supplying moisture to said zone whereby the particles are moistened and caused to contact together to form random composite aggregates, the amount of moisture added in said zone being such that the anhydrous lactose is caused to be sticky and to cause all of the particles in said zone to adhere together, removing the moist aggregates from said zone and then removing excess moisture from the aggregates.

5. As an article of manufacture, porous aggregates consisting mainly of particles of crystallized lactose powder adhered together in random fashion and cyclamate homogeneously dispersed within the aggregates, the cyclamate comprising about 5 to 10% of the product.

References Cited in the file of this patent

UNITED STATES PATENTS

| | | |
|---|---|---|
| 2,803,551 | Helgren | Aug. 20, 1957 |
| 2,851,364 | Peebles | Sept. 9, 1958 |
| 2,876,105 | Jucaitis et al. | Mar. 3, 1959 |